United States Patent [19]

Kane

[11] Patent Number: 4,793,463
[45] Date of Patent: Dec. 27, 1988

[54] TURNOVER DEVICE

[75] Inventor: John P. Kane, Sterling Hts., Mich.

[73] Assignee: Allied Automation Systems, Inc., Detroit, Mich.

[21] Appl. No.: 120,936

[22] Filed: Nov. 16, 1987

[51] Int. Cl.⁴ .............................................. B65G 47/24
[52] U.S. Cl. .................................... 198/403; 198/411; 414/759
[58] Field of Search ............... 198/402, 403, 411, 412; 74/89.16, 98; 414/759, 774, 775

[56] References Cited

U.S. PATENT DOCUMENTS

| | | |
|---|---|---|
| 591,712 | 10/1897 | Worth ................................ 198/403 |
| 3,552,538 | 1/1971 | Twiggs . |
| 3,581,910 | 6/1971 | Field et al. . |
| 3,780,882 | 12/1973 | Wagner . |
| 4,533,291 | 8/1985 | Nishida . |

FOREIGN PATENT DOCUMENTS

| | | |
|---|---|---|
| 16414 | 10/1956 | Fed. Rep. of Germany ...... 198/403 |
| 0592690 | 2/1978 | U.S.S.R. ............................... 198/403 |
| 1093658 | 5/1984 | U.S.S.R. ............................... 198/403 |

Primary Examiner—L. J. Paperner
Assistant Examiner—D. Glenn Dayoan
Attorney, Agent, or Firm—Basile and Hanlon

[57] ABSTRACT

A turnover device for turning over articles as they are conveyed along a production path. The turnover device comprises a frame, two spaced apart and parallel axis, first and second carrier arms mounted respectively on the axes for rotational movement, first and second meshing gears mounted on the axes respectively, and a drive motor and lever. The first and second meshing gears have pitch diameters such that, as the two carrier arms counter-rotate from a start position to a finish position, the first carrier arm will rotate through an arc of approximtely 108° and the second carrier arm will rotate through an arc of approximately 72°. The arms are then rotated to their start position. An article placed on a first carrier arm will drop off onto the second carrier arm and be carried back down to a horizontal orientation which is flipped end to end with respect to its starting orientation.

11 Claims, 5 Drawing Sheets

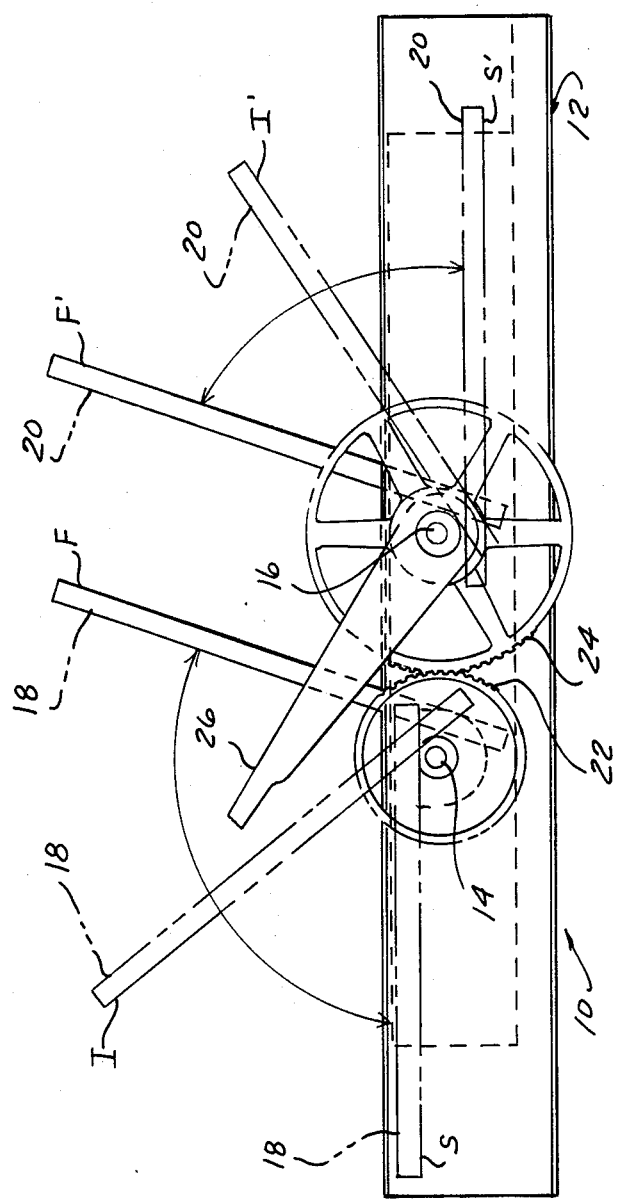
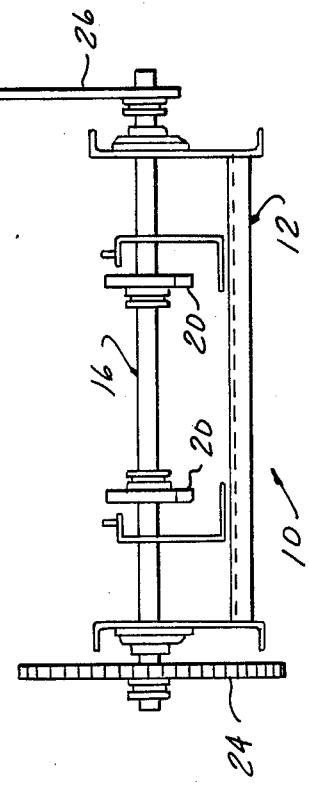
FIG-2
FIG-3

TURNOVER DEVICE

BACKGROUND OF THE INVENTION

1. Field of the Invention

The invention relates to turnover mechanisms used in association with conveyers for the purpose of turning over individual articles carried on the conveyer and, more particularly, to such a device which utilizes a simple synchronized gear system for controlling the rates of rotations of a pair of counter rotating carrier members.

2. Description of the Relevant Prior Art

Mechanisms designed for turning over articles being advanced along a production path have long been known in the prior art. Moreover, the employment of counter rotating arms to effect the turnover is also known. For examples of U.S. Patents which disclose turnover devices employing counter rotating arms, see for example U.S. Pat. Nos. 3,552,538; 3,780,882; and 4,533,291. The counter rotating arms disclosed in the above listed patents are, typically, initially disposed horizontally, with the respective axes of rotation parallel and spaced apart from each other. An article is carried by a conveyer onto an upper surface of one of the pair of the counter rotating arms. The pair of arms are caused to rotate towards each other until they are disposed in parallel, spaced apart vertical planes. To help effectuate the turnover, the parallel planes may be slightly inclined from the vertical, as shown in U.S. Pat. No. 3,780,882. The article is thereby transferred to the second of the pair of counter rotating arms. The arms are then caused to rotate back to their substantially horizontal, initial positions. At that point the article will lie atop an upper surface of the conveyer.

While the devices disclosed in these patents are affective in turning an article over, they are complicated and, hence, relatively expensive mechanisms for controlling and coordinating the relative rates of counter rotation of the pair of arms. In U.S. Pat. No. 3,780,882, the counter rotating arms are independently pivoted by hydraulic actuators. In U.S. Pat. No. 3,581,910, counter rotating arms are mounted on separate, rotatable shafts where they are connected to inboard arms so constructed and located to cause the inboard edge of the article to drop down below a receiving position. Additional arms are connected to the outboard end of the counter rotating arms. In U.S. Pat. No. 4,533,291, the counter rotating arms are connected at one end to attachment plates upon which the article is placed and at the other end to arm holders. The arm holders are, in turn, rotatably supported by first and second carriers. First and second crank drive mechanisms are associated with the carriers and rock the counter rotating arms in an inlet-outlet direction when the carriers are moved in that direction. Carrier drive means are provided for driving the first and second carriers simultaneously in opposite directions so that they may approach to each other and separate from each other.

It would be desirable to provide a turnover device useful in a production line which has relatively few moving parts, and is inexpensive and quiet.

It would also be desirable to provide such a devise which has straight-through capabilities and a low profile.

It would also be highly desirable to provide such a devise which is useful for turning over such mass produced, relatively flat and heavy articles such as tire and wheel assemblies.

SUMMARY OF THE INVENTION

Disclosed and claimed herein is a device for turning over an article as it advances through a production path. The turnover device comprises first and second axes which are mounted in a frame in a parallel and spaced apart relation. A first carrier arm is rotationally mounted about the first axis for rotational movement with respect to the frame and a second carrier arm is mounted about the second axis for rotational movement with respect to the frame. Gear means are provided for synchronizing the relative rotational movement of the first and second carrier arms with respect to each other such that the first rotational carrier arm will rotate in one rotational direction from a first, loading position to a second, unloading position, at the same time the second carrier arm rotates in the opposite rotational direction from a first, unloaded position to a second loaded position. In its first position, the first carrier arm is oriented in a substantially horizontally plane in order to receive a moving article from, for example, a conveyor belt. In its second position, the first carrier arm will have rotated more than 90° about the first axis, thus causing the article carried thereon to drop off of the first carrier arm. When the second carrier arm is in its first position, it is also oriented in a horizontal plane, but extends in the opposite direction from the first carrier arm. It then rotates in the opposite rotational direction to its second position, wherein it is oriented in a plane substantially parallel to that of the first carrier arm in its second position. Thus, the article which has just unloaded from the first carrier arm will then load onto the second carrier arm, which will then rotate back to its first, horizontal position so that the article carried thereon may move back onto the conveyor. The orientation of the article after it leaves the herein device will be 180° end to end from the orientation it had before it entered the device. Thus, the herein device provides a simple means of turning an article over end to end as it advances along a production path. As the synchronized gear means rotates the second carrier arm back to its first position, the first carrier arm will be rotated in the opposite rotational direction back to its first position where it will be ready to receive another such article. Thus, the instant invention lends itself to incorporation into a repetitive, high speed, assembly line type of production path.

To effect turnover of the article, it is necessary that the first carrier arm rotate more than 90°. It has been found that effective turnover will occur if the first carrier arm traverses an arc in a range of between 100° and 130° with respect to the horizontal as it rotates from the first to the second position. Due to the synchronization of the meshing gears, the second carrier arm will necessarily traverse an arc in the range of between 50° and 80° with respect to the horizontal as it rotates from the first to the second position in a opposite rotational direction.

In order to accomplish the counter-rotation of the first and second carrier arms through their respective desirable arcs of turning, the synchronized gear means preferably comprises first and second meshing gears, said first meshing gear having a pitch diameter D1 and said second meshing gear having a pitch diameter D2 such that the ratio of D1 to D2 is approximately 2 to 3. For example, the first meshing gear could have a pitch diameter of 18 inches, and a second meshing gear have a diameter of 27 inches. Assuming an equal tooth density on both the first and second meshing gears, the first meshing gear will have two thirds of the number of teeth of the second meshing gear. Hence, for every single rotation of the first meshing gear, the second meshing gear will rotate approximately 270°. If the first meshing gear is made to rotate 108°, the second meshing gear will rotate 72° in the opposite direction. However, a different ratio of gearing may be used. Also, to decrease the size of the first and second gears, one or more pairs of idler gears may be used, the two members of each pair rotating in opposite directions.

The turnover mechanism of the instant invention may further comprise drive means which is connected to one of the first or second axes for imparting rotational movement thereto. For example, the drive means may comprise a hydraulic cylinder drive. Alternatively, motorized drive means may be employed. Lever means may be mounted on either the first or second axis to cooperate with the drive means to cause rotational movement of the axis to which it is mounted.

BRIEF DESCRIPTION OF THE DRAWING

The herein invention may best be understood by reference to the following detailed description and drawing in which:

FIG. 2 is a side elevational view of the turnover device of FIG. 1;

FIG. 3 is a rear elevational view of the turnover device of FIG. 1;

DETAIL DESCRIPTION OF THE PREFERRED EMBODIMENTS

Figure 1:
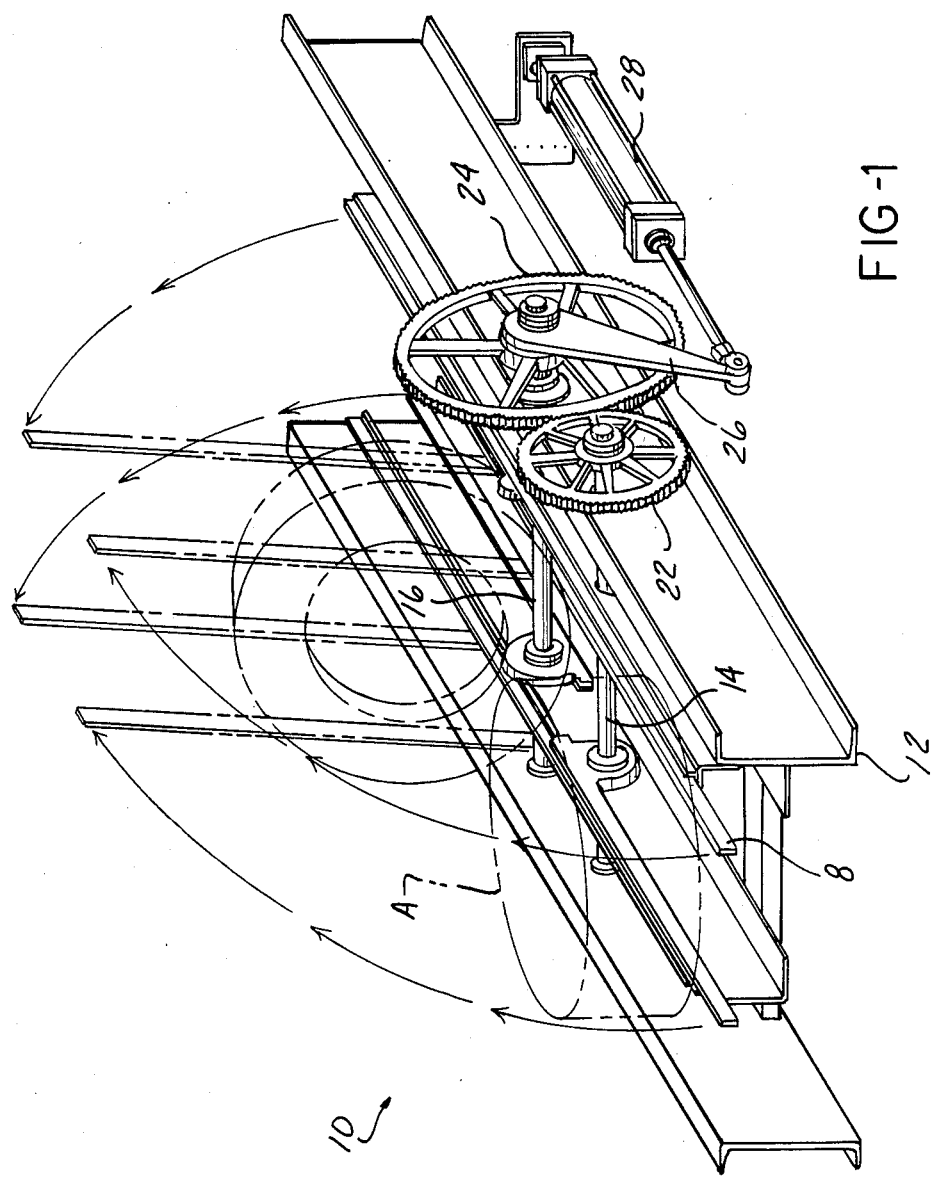
FIG. 1 is a perspective view of a turnover device of the instant invention with an article being turned over shown in outline.
Figure 4:
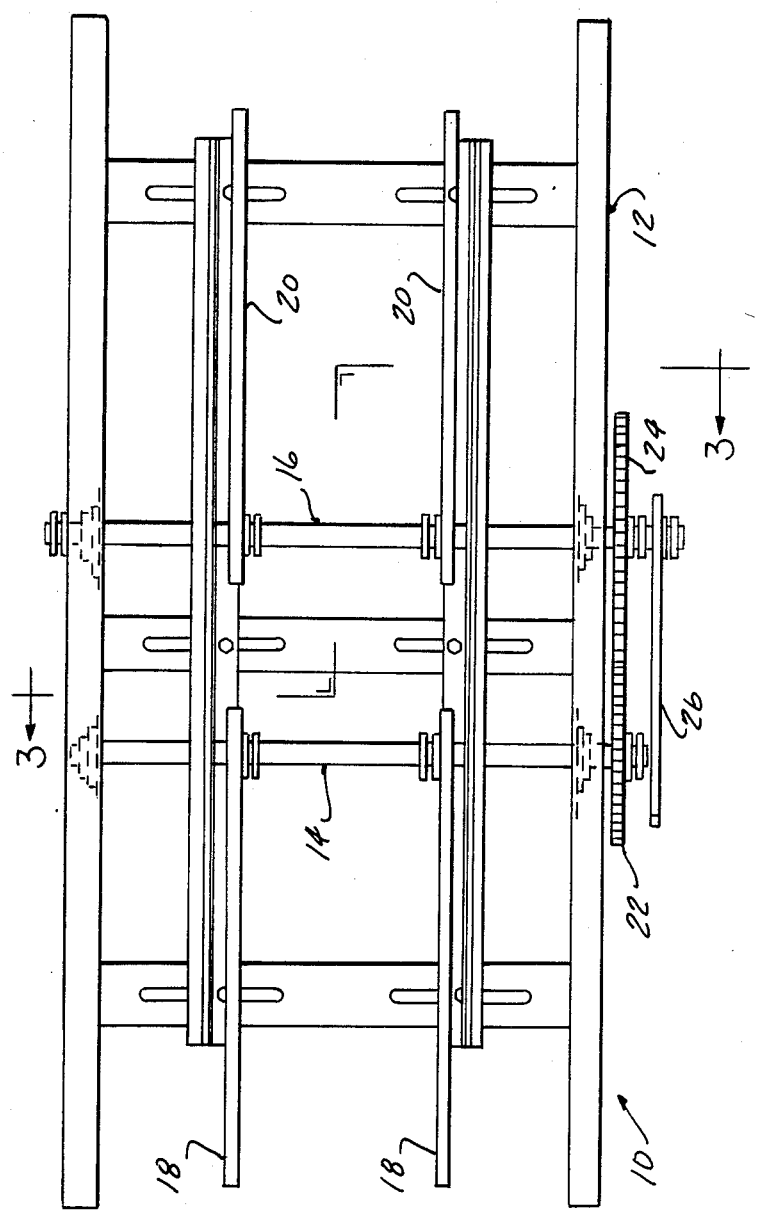
FIG. 4 is a plan view of the turnover device of FIG. 1.
Figure 5:
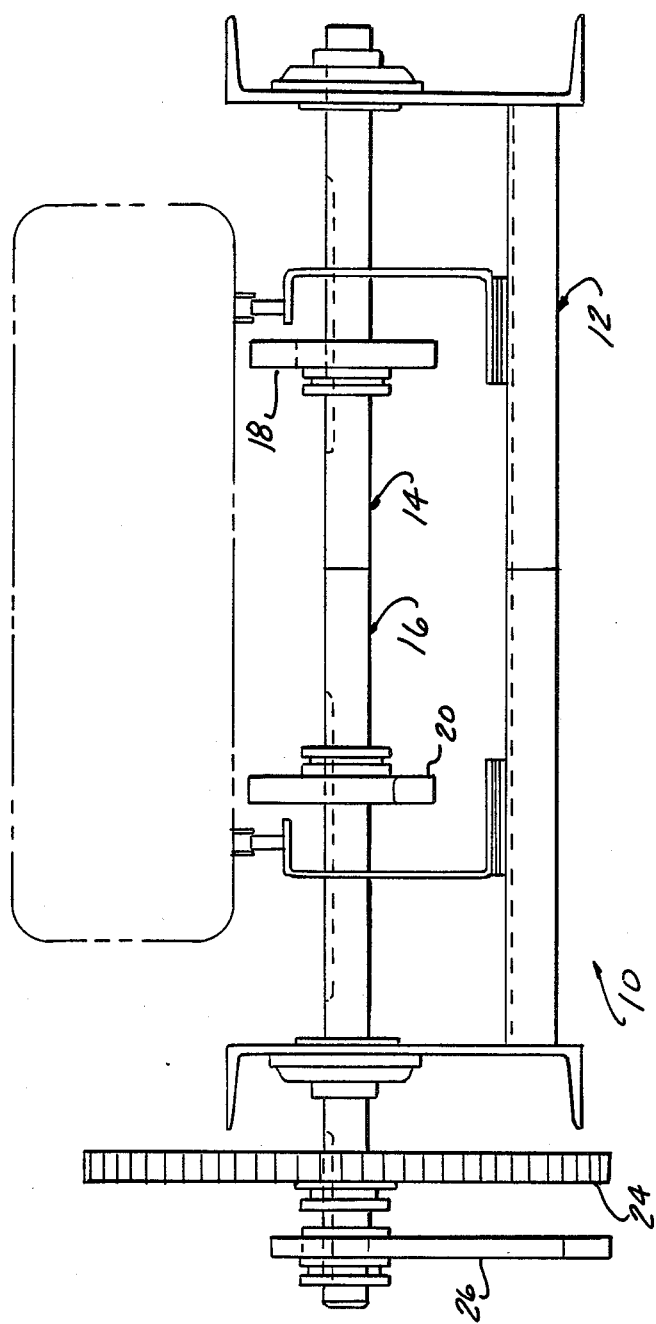
FIG. 5 is a rear cross-sectional view of the turnover device of FIG. 3 along lines 3—3.

Throughout the following detailed description like reference numerals are used to reference the same feature of the invention shown in multiple figure of the drawing.

Referring now to the drawings and in particular to FIGS. 1, 2, 3, and 4 there is depicted a turnover device 10 of the instant invention. First and second axes 14, 16 are mounted in frame 12 in a spaced apart and parallel relation to each other. A first carrier arm 18 is mounted for rotation about first axis 14, and a second carrier arm 20 is mounted for rotation about second axis 16. Alternatively, first and second axes 14, 16 may be rotationally mounted within frame 12 and carrier arms 18, 20 may be fixedly mounted on their respective axis for rotation.

A first meshing gear 22 is mounted on first axis 14, and a second meshing gear 24 is mounted on second axis 16 in the manner depicted in FIG. 1. Each of said meshing gears 22, 24 are toothed gears and are mounted for engagement with each other. Oppositionally, a lever 26 may be mounted on one of the first or second axes 14, 16. In the embodiment depicted in FIG. 1, the lever 26 is shown mounted to second axis 16. A drive means 28 is connected to one of the first and second axes 14, 16 for imparting rotational movement thereto. In the embodiment depicted, drive means 28 is shown connected to second axis 16. Lever means 26 cooperates with drive means 28 to cause stopping and starting of rotational movement of axis 16.

As can be seen in FIG. 2, first carrier arm 16 is mounted to first axis 14 such that it is oriented in a horizontal manner when in the start position, labeled "S" in the drawing. Likewise, second carrier arm 20 is mounted on second axis 16 also in a horizontal orientation when at the start position, labeled "S'". However, first carrier arm 18 is mounted on the top of first axis 14 and second carrier arm is mounted on the bottom of second axis 16 when the carrier arms are in their start positions. Hence, the plane occupied by carrier arm 18 is parallel to and displaced upwardly from that occupied by carrier arm 20. When second axis 16 is caused to rotate in a counter-clockwise manner, thereby causing second meshing gear 24 also to rotate counter-clockwise, second carrier arm 20 is counter-clockwise rotated to an intermediate position labeled "I" in FIG. 1. Due to the synchronized meshing between first and second meshing gears 22, 24, rotation of second meshing gear 24 will cause first meshing gear 22 to rotate in the opposite rotational direction, that is, in a clockwise direction. This will cause first axis 14 and first carrier arm 18 to also rotate clockwise to the intermediate position labeled "I'" in FIG. 1. Since second meshing gear 24 has a pitch diameter one and a half times larger than the pitch diameter of first meshing gear 22, the distance traveled by first carrier arm 18 as it reaches the intermediate position will be twice as great as the distance traveled by second carrier arm 20 when it is in its intermediate position. The two arms will be counter-rotating toward each other. As rotation of second axes 16 continues, second meshing gear 24 and carrier arm 20 will continue to rotate counter-clockwise until the final position "F" is reached. Likewise, first meshing gear 22 and carrier arm 18 will continue to rotate clockwise until the final position "F'" is reached. In their final positions, first and second carrier arms 18, 20 will be in planes which are parallel to and spaced apart from each other. First carrier arm 18 will have traversed an arc of greater than 90°, and second carrier arm will have traversed an arc of less than 90°. Preferably, the arc traversed by first carrier arm 18 will be in a range between 100° and 130° and that traversed by second carrier arm 20 will be in a range of between 500° and 800°. It has been found that favorable results are achieved if first carrier arm 18 traverses an arc of approximately 108° with respect to the horizontal, and second carrier arm 20 traverses an arc of approximately 72° with respect to the horizontal. Obviously, if the ratio of the pitch diameters of first and second meshing gears 20, 22 is two to three, the first carrier arm 20 will necessarily have to traverse an arc of approximately 108°, and the second carrier arm and arc of 72° because the arcs of travel of the two arms must display an inverse relationship to the ratio of the pitch diameters of the meshing gears.

For some applications, however, the preferred arc of turning for first carrier arm 18 may be more than 108°, depending on the shape and weight distribution of the object being turned. For example, for domed wheel assemblies, it has been found that a turning arc of approximately 120° or more will effectuate the tunover.

If an article A is placed on an upper surface of first carrier arm 18 when it is in the start position, it will be carried with the carrier arm as it rotates in the clockwise rotational direction until it has traveled more than 90° into the final position "F". At this point, it will no longer be supported by the first carrier arm 18 and will drop off the carrier arm due to the effects of gravity. The second carrier arm 20 will also be in its final position "F'" and, due to the parallel and spaced apart relationship between the first and second carrier arms 18 and 20, it will be ready to receive the article on its upper surface as the article drops off the first carrier arm 18. At this point, the direction of rotation of second meshing gear 24 is reversed, and second axis 16 and second carrier arm 20 are caused to rotate in a clockwise direction back to the start position. The article which is being supported by carrier arm 20 will likewise travel in a clockwise direction until it is again on a horizontal surface at the start position. At the same time, first gear means 22, first axis 14, and first carrier arm 18 will rotate back in a counter-clockwise direction to the start position.

Figure 6:
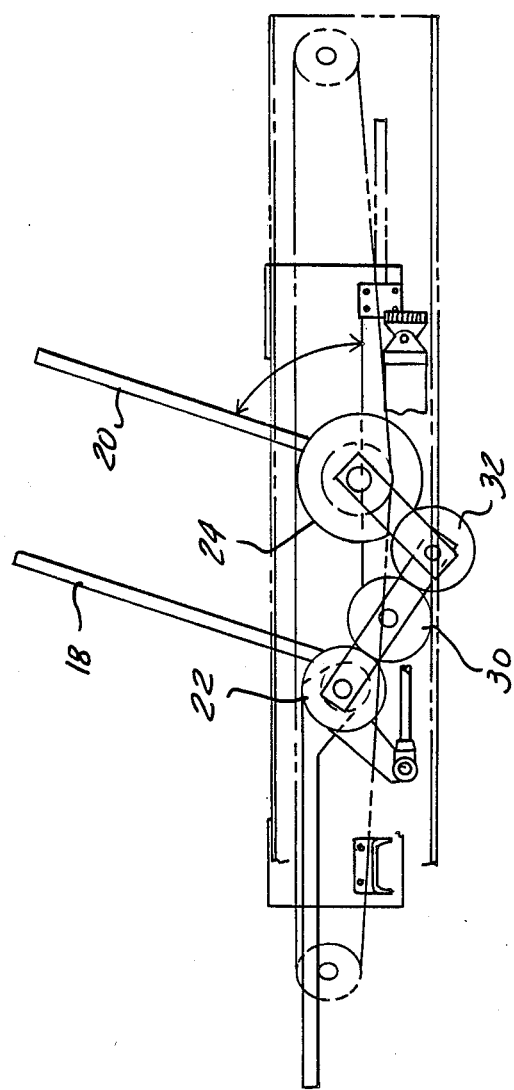
FIG. 6 is an alternate embodiment of the turnover device of the instant invention shown in side elevational view.

In FIG. 6, an alternative embodiment of the present invention is depicted. Meshing gears 22, 24 are reduced in size. To compensate for the size reduction, a pair of idler gears 30, 32 are employed. Idler gear 30 meshes with first meshing gear 22 and rotates counter-directionally thereto. Idler gear 32 meshes with idler gear 30 and second meshing gear 24 and rotates counter-rotationally thereto in this way. The counter-rotation of arms 18, 20 is preserved.

It is contemplated that the herein device will be used in an assembly line type of production process. Articles may be continuously conveyed by such means as conveyor belts onto the first carrier arm 18. The articles will then be rotated and turned as described above. At the end of the turnover procedure, the articles will overlie the second carrier arm, but in a reverse end to end orientation relative to their initial orientation when they were supported by first carrier arm 18. At that point, the conveyer means will remove them from the second carrier arm and convey them to another stage of the production line. At the same time an article is discharged from the second carrier arm 20, the first carrier arm 18 will be in the start position and will be ready to support another of the succession of articles. Hence, the herein device may be used to turnover a succession of articles as they are conveyed through a production path. It has the advantage of having a straight line configuration relative to the rest of the production path, and utilizes one simple set of meshing gears instead of the complicated counter-rotating mechanisms found in the prior art described above. Moreover, the articles are advanced along the high-speed production path as they are being turned over. The articles remain correctly centered during the turnover process, an important advantage if further processing of the articles is performed. The herein turnover device produces a gentle, gradual turnover which does not jar or jostle the articles, thus preventing undue damage to both the device and the articles.

Doubtless, the description of the embodiments disclosed herein may suggest other embodiments and designs to one skilled in the art. The true scope of the herein invention is not limited by the embodiments and exemplifications depicted, but rather solely by the scope of the claims appended hereto.

I claim:

1. A device for turning over an article as it advances through a production path comprising:
   first and second shaft means mounted in parallel relationship to each other;
   a first turning member rotationally mounted on the first shaft means for rotational movement;
   a second turning member rotationally mounted on the second shaft means for rotational movement; and
   gear means including synchronously meshing first and second gears mounted respectively on said first and second shaft means for synchronizing the relative rotational movement of the first and second members with respect to each other such that the first rotational member will rotate in one rotational direction from a first, loading position, wherein it is oriented in a substantially horizontal plane, to a second, unloading position, wherein it has rotated more than 90° about the first axis, as the second member rotates in the opposite rotational direction from a first, unloaded position wherein it is oriented in a horizontal plane, to a second, loaded position, wherein it is oriented in a plane substantially parallel to the first member in the second position.

2. The device of claim 1 wherein the first meshing gear has a pitch diameter D1 and the second meshing gear has a pitch diameter D2, the ratio D1/D2 being approximately equal to 0.667.

3. The device of claim 1 wherein the gear means further comprises at least one pair of idler gears, the first member of which meshes with and rotates counter to the first meshing gear and the second member of which meshes with and rotates counter to the first idler gear and the second meshing gear.

4. A device for turning over an article as it advances through a production path comprising:
   a support frame;
   first and second axes rotatably mounted on said frame;
   a first carrier arm mounted above the first axis for rotation with respect to the frame;
   a second carrier arm mounted about the second axis for rotation with respect to the frame;
   synchronously meshing first and second gear means mounted on, respectively, the first and second axes for synchronizing the relative rotational movements of the first and second carrier arms with respect to each other such that the first carrier arm will rotate in one rotational direction from a first loading position, wherein it is oriented in a substantially horizontal plane, to an unloading position, wherein it has rotated more than 90° with respect to the horizontal, as the second carrier arm rotates in the opposite rotational direction from a first, unloaded position, wherein it is oriented in a second substantially horizontal plane displaced below the first horizontal plane, to a second, loaded position, wherein it is oriented substantially parallel to and spaced apart from the first carrier arm in the second position:
   drive means connected to one of the first axis and second axis for imparting rotational movement thereto; and
   lever means mounted on one of the first axis and second axis and cooperating with said drive means to cause rotational movement of the one axis.

5. The device of claim 4 wherein the gear means synchronizes the relative rotational movement of the first and second carrier arm with respect to each such that the first carrier arm will further rotate in the opposite rotation direction back to its first position as the second arm rotates in the one rotational direction back to its first position.

6. The device of claim 4 wherein the first carrier arm traverses an arc in a range of between 100° and 120° with respect to the horizontal as it rotates from the first to the second.

7. The device of claim 4 wherein the second carrier arm traverses an arc in a range of between 60° and 80° with respect to the horizontal as it rotates from the first to the second position.

8. The device of claim 6 wherein the first carrier arm traverses an arc of approximately 108° with respect to the horizontal as it rotates from the first to the second position.

9. The device of claim 7 wherein the second carrier arm traverses an arc of approximately 72° with respect to the horizontal as it rotates from the first to the second position.

10. The device of claim 4 wherein the gear means comprise synchronously meshing first and second gears mounted, respectively, about the first and second axes.

11. The device of claim 10 wherein the first meshing gear has a pitch diameter D1 and the second meshing gear has a pitch diameter D2, the ratio D1/D2 being approximately equal to 0.667.

* * * * *